US008833782B2

(12) United States Patent
Huotari et al.

(10) Patent No.: US 8,833,782 B2
(45) Date of Patent: Sep. 16, 2014

(54) INDEPENDENT RUNNING BOARD ACTUATION

(75) Inventors: Keijo J. Huotari, Fenton, MI (US); Kenneth Holbrook, Hickory Creek, TX (US)

(73) Assignee: Magna International Inc. (CA)

( * ) Notice: Subject to any disclaimer, the term of this patent is extended or adjusted under 35 U.S.C. 154(b) by 341 days.

(21) Appl. No.: 13/317,562

(22) Filed: Oct. 21, 2011

(65) Prior Publication Data

US 2012/0098231 A1    Apr. 26, 2012

Related U.S. Application Data

(60) Provisional application No. 61/455,543, filed on Oct. 22, 2010.

(51) Int. Cl.
 *B60R 3/00* (2006.01)
 *B60R 3/02* (2006.01)
(52) U.S. Cl.
 CPC ........................................ *B60R 3/02* (2013.01)
 USPC .......................................... 280/166; 280/163
(58) Field of Classification Search
 CPC ............ B60R 3/00; B60R 3/02; B60R 3/002; B60R 3/007; B60R 9/02; B61D 23/00; B61D 23/02; B61D 23/025; E06C 5/00; E06C 5/02; E06C 5/04; E06C 5/16
 USPC ................. 280/166, 727, 163, 164.1; 296/62; 182/127; 340/425.5, 438, 547, 545.6, 340/686.1
 See application file for complete search history.

(56) References Cited

U.S. PATENT DOCUMENTS

| | | | |
|---|---|---|---|
| 6,375,207 B1 * | 4/2002 | Dean et al. ..................... | 280/166 |
| 6,641,158 B2 * | 11/2003 | Leitner ......................... | 280/166 |
| 6,938,909 B2 * | 9/2005 | Leitner ......................... | 280/166 |
| 6,942,233 B2 * | 9/2005 | Leitner et al. ................. | 280/166 |
| 7,007,961 B2 * | 3/2006 | Leitner et al. ................. | 280/166 |
| 7,017,927 B2 * | 3/2006 | Henderson et al. ........... | 280/166 |
| 7,055,839 B2 * | 6/2006 | Leitner ......................... | 280/166 |
| 7,070,194 B2 * | 7/2006 | Garland et al. ............... | 280/166 |
| 7,118,120 B2 * | 10/2006 | Lee et al. ...................... | 280/166 |
| 7,163,221 B2 * | 1/2007 | Leitner ......................... | 280/166 |
| 7,367,574 B2 * | 5/2008 | Leitner ......................... | 280/166 |
| 7,380,807 B2 * | 6/2008 | Leitner ......................... | 280/166 |
| 7,398,985 B2 * | 7/2008 | Leitner et al. ................. | 280/166 |
| 7,413,204 B2 * | 8/2008 | Leitner ......................... | 280/163 |
| 7,444,210 B2 * | 10/2008 | Breed et al. ....................... | 701/1 |
| 7,469,916 B2 * | 12/2008 | Watson ......................... | 280/166 |
| 7,513,565 B2 * | 4/2009 | Watson ......................... | 296/199 |
| 7,584,975 B2 * | 9/2009 | Leitner ......................... | 280/166 |

(Continued)

*Primary Examiner* — J. Allen Shriver, II
*Assistant Examiner* — James M Dolak
(74) *Attorney, Agent, or Firm* — Warn Partners, P.C.

(57) ABSTRACT

A drop-down running board assembly includes at least one linkage assembly connected to a vehicle having at least one door, and a sensor having a first part and a second part, one part of the sensor is mounted to a door, the other part of the sensor mounted to the vehicle. A step portion is connected to the linkage assembly. There is also an actuator connected to the linkage assembly such that the actuator moves the linkage assembly and the step portion to a deployed position when the door is opened and the first part of the sensor is moved away from the second part of the sensor, and a retracted position when the door is closed and the first part of the sensor is positioned substantially adjacent the second part of the sensor.

27 Claims, 6 Drawing Sheets

(56) References Cited

U.S. PATENT DOCUMENTS

| | | | |
|---|---|---|---|
| 7,692,542 B2* | 4/2010 | Outzs | 340/547 |
| 7,976,042 B2* | 7/2011 | Watson et al. | 280/166 |
| 8,136,826 B2* | 3/2012 | Watson | 280/166 |
| 8,262,113 B1* | 9/2012 | Chafey et al. | 280/166 |
| 8,342,551 B2* | 1/2013 | Watson | 280/166 |
| 8,602,431 B1* | 12/2013 | May | 280/166 |
| 8,662,512 B2* | 3/2014 | May | 280/166 |
| 2007/0159308 A1* | 7/2007 | Johnston | 340/425.5 |
| 2007/0194916 A1* | 8/2007 | Hewitt et al. | 340/545.6 |
| 2007/0267842 A1* | 11/2007 | Seibert et al. | 280/166 |

* cited by examiner

INDEPENDENT RUNNING BOARD ACTUATION

CROSS-REFERENCE TO RELATED APPLICATIONS

This application claims priority to U.S. Provisional Application No. 61/455,543 filed on Oct. 22, 2010. The disclosure of the above application is incorporated herein by reference.

FIELD OF THE INVENTION

The present invention relates to a system used to actuate a device such as a power running board based on the condition of the vehicle, such as when a vehicle door is opened or closed.

BACKGROUND OF THE INVENTION

Drop-down running boards for vehicles are generally known, and are most commonly used for sport utility vehicles and pick-up trucks, which sit higher off of the ground compared to a car. Drop-down running boards move between a retracted position when the vehicle doors are closed and a deployed position when one or more of the vehicle doors is opened.

Typical drop-down running boards are activated by a signal received by the vehicle's computer indicating that one or more of the doors are open. The signal is typically the vehicle's "door ajar" signal. Each drop-down running board is activated separately from one another, based on which side of the vehicle has an open door.

One problem that exists with current drop-down running boards is that during installation, connecting the running board to be controlled by the door ajar signal in the vehicle computer is time consuming. Additionally, different vehicle assembly lines have different methodologies for identifying the vehicle's door ajar signal, which may change the way the drop-down running board is installed onto the vehicle.

Accordingly, there exists a need for a drop-down running board which operates based on a signal independent from the door ajar signal, and allows for installation without having to connect directly into the vehicle's existing wiring system.

SUMMARY OF THE INVENTION

The present invention is directed to a drop-down running board system having sensors used for detecting the position of the vehicle door to provide an indication of when the drop-down running board is to be actuated between a deployed position and a retracted or stowed position.

The drop-down running board assembly of the present invention includes at least one linkage assembly connected to a vehicle having at least one door, and a sensor having a first part and a second part, one part of the sensor is mounted to a door, the other part of the sensor mounted to the vehicle. A step portion is connected to the linkage assembly.

There is also an actuator connected to the linkage assembly such that the actuator moves the linkage assembly and the step portion to a deployed position when the door is opened and the first part of the sensor is moved away from the second part of the sensor. The actuator moves the drop-down running board to a retracted position when the door is closed and the first part of the sensor is positioned substantially adjacent the second part of the sensor.

In one embodiment, the running board actuation of the present invention incorporates a separate sensor system which has at least two parts. One part of the sensor is installed onto the door and another part of the sensor is installed in the door opening, or door sill, of the vehicle. A signal from the sensor is sent to the vehicle computer when the door is ajar and there is enough separation between the two parts of the sensor. When the sensors are within a predetermined proximity relative to one another, a signal is sent indicating that the door is closed. These signals are used to provide the actuation of the drop-down running board between open and closed positions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
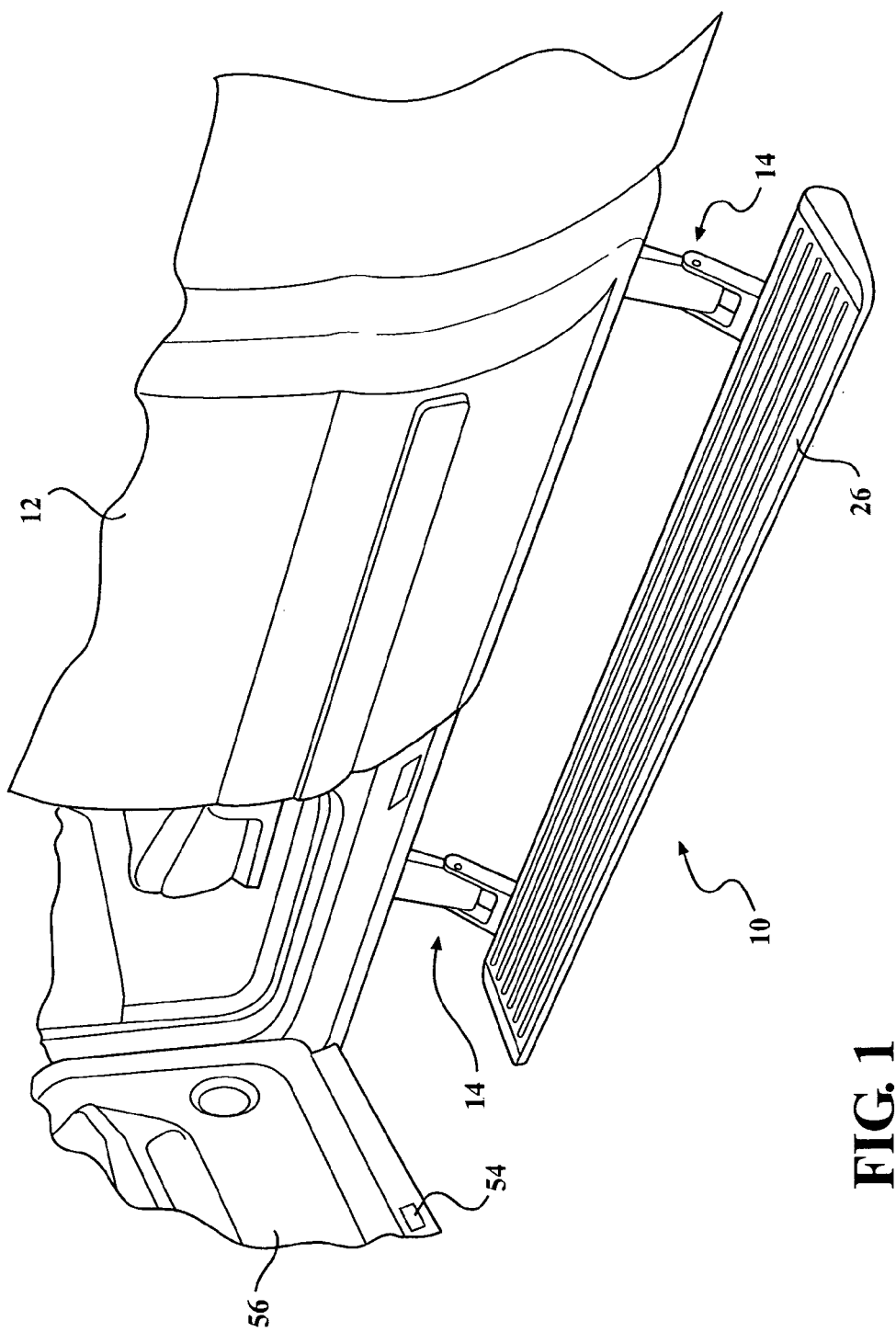
FIG. 1 is a first perspective view of a drop-down running board attached to a vehicle, according to the present invention.
Figure 2:
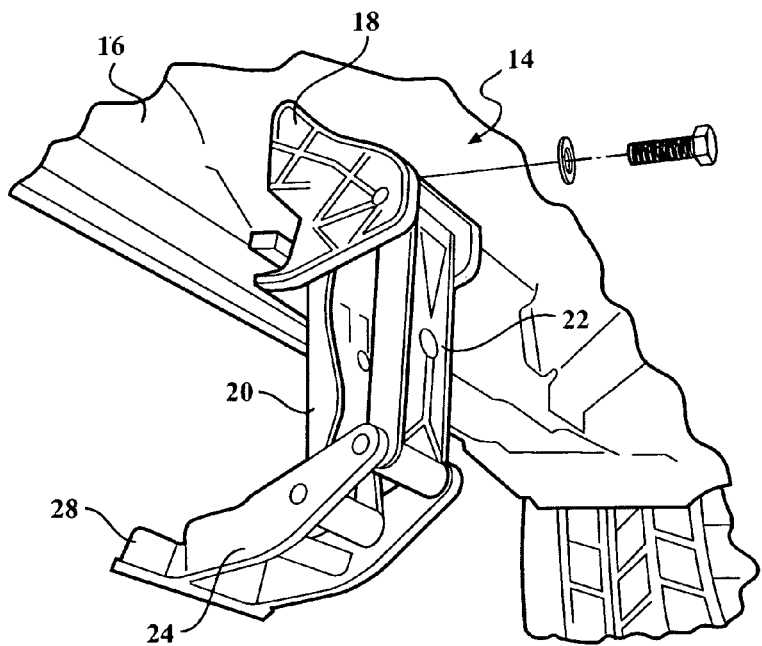
FIG. 2 is a rear perspective view of a linkage assembly attached to the frame of a vehicle used in the operation of a drop-down running board, according to the present invention.
Figure 3:
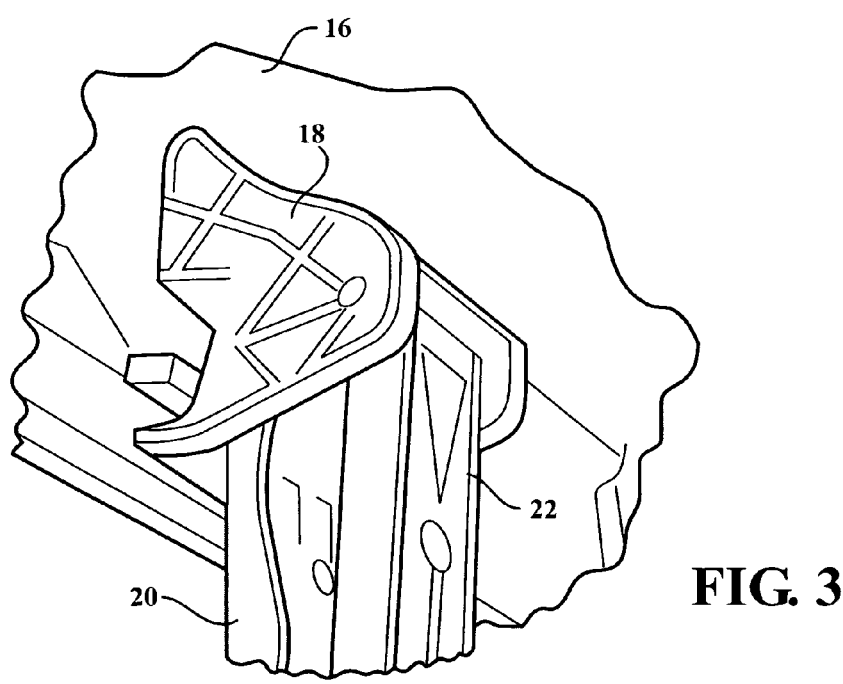
FIG. 3 is an enlarged rear perspective view of a linkage assembly attached to the frame of a vehicle used in the operation of a drop-down running board, according to the present invention.

The following description of the preferred embodiment(s) is merely exemplary in nature and is in no way intended to limit the invention, its application, or uses.

Referring to Figures generally, a drop-down running board according to the present invention is shown generally at 10. The running board 10 is attached to a vehicle 12 through the use of a pair of linkage assemblies, generally shown at 14. More specifically, there is a first linkage assembly, shown generally at 14a, and a second linkage assembly, shown generally at 14b. Each of the linkage assemblies 14 is connected to the vehicle frame 16. Each linkage assembly 14a, 14b includes a base bracket 18 connected to the frame 16. There is also a first inner link 20 and a second inner link 22 pivotally connected to the base bracket 18, and each of the inner links 20,22 is pivotally connected to an outer link 24. The outer link 24 of each linkage assembly 14a, 14b supports a step portion 26 of the running board 10 through the use of an outer bracket 28.

Figure 10:
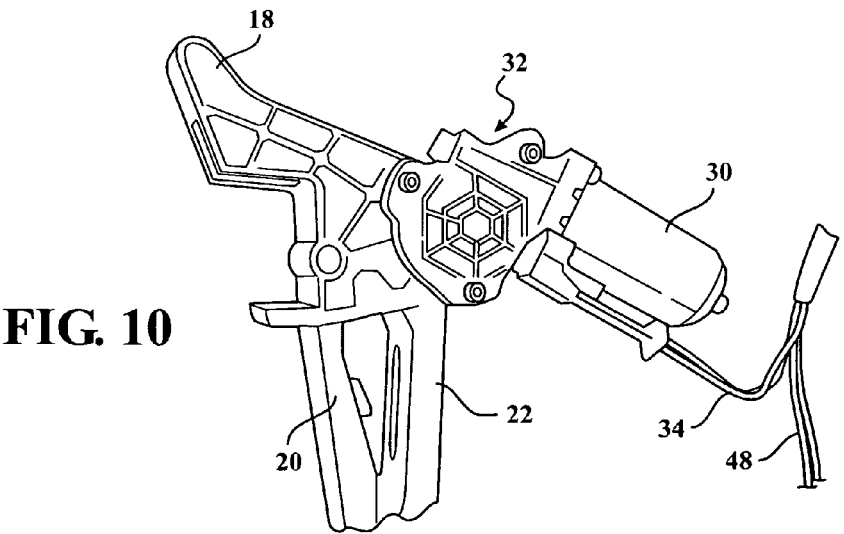
FIG. 10 is a perspective view of a motor connected to a linkage assembly used in the operation of a drop-down running board, according to the present invention.
Figure 11:
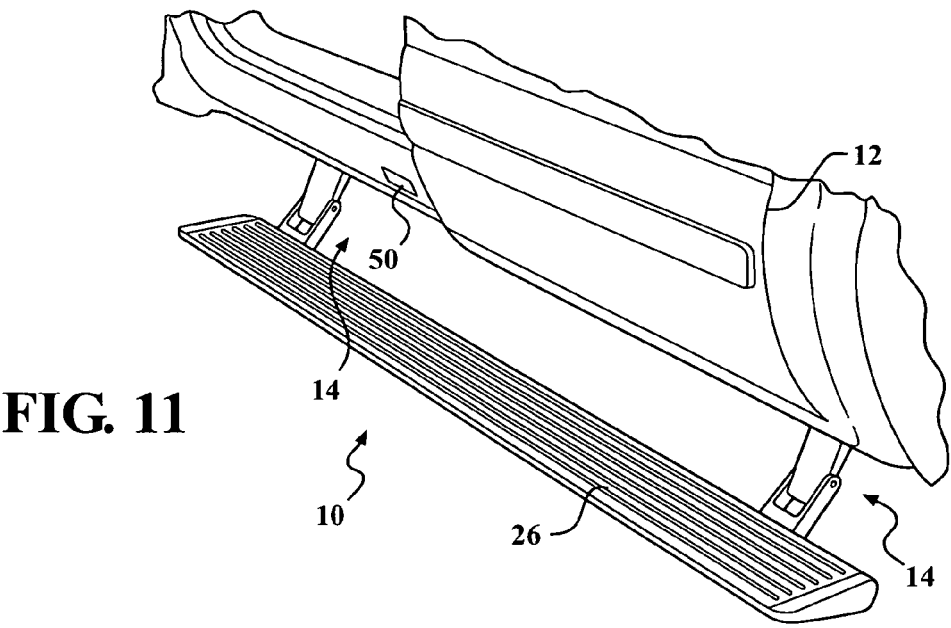
FIG. 11 a second perspective view of a drop-down running board attached to a vehicle, according to the present invention.
Figure 12:
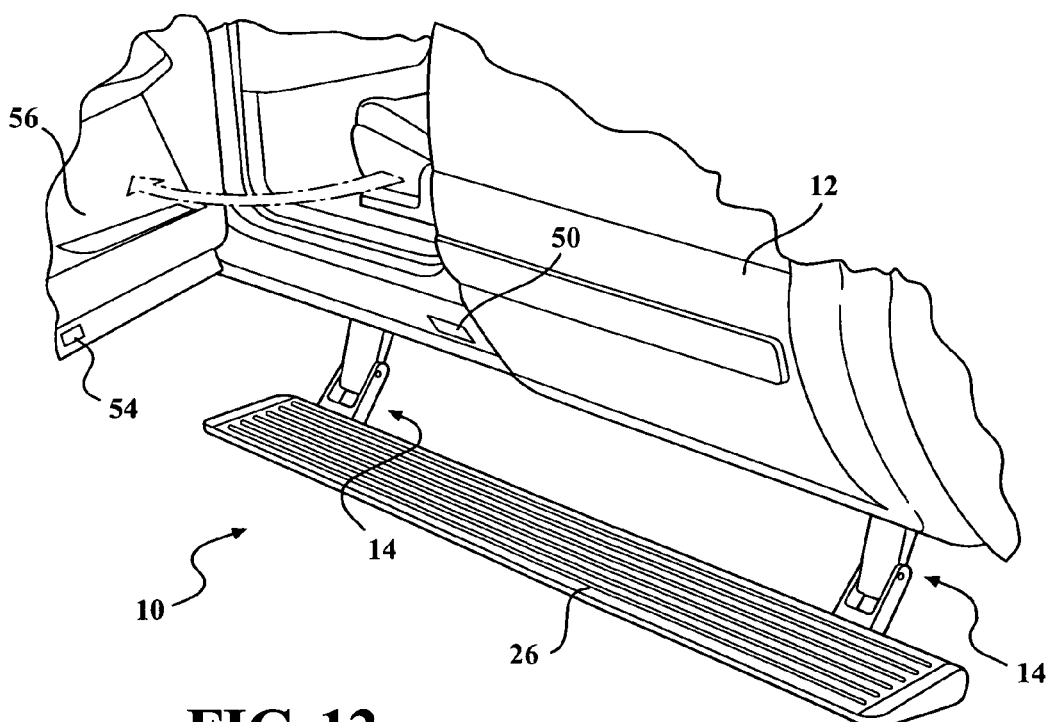
FIG. 12 a third perspective view of a drop-down running board attached to a vehicle, according to the present invention.

Referring to FIG. 10, movement of the inner links 20, 22 and the outer link 24 is achieved through the use of an actuator, which in this embodiment is in the form of an electric motor 30 used in combination with a gear train assembly, shown generally at 32, and the gear train assembly 32 is connected to the second inner link 22 of one of the linkage assemblies 14. In this embodiment, the gear train assembly 32 is connected to the first linkage assembly 14a.

Figure 4:
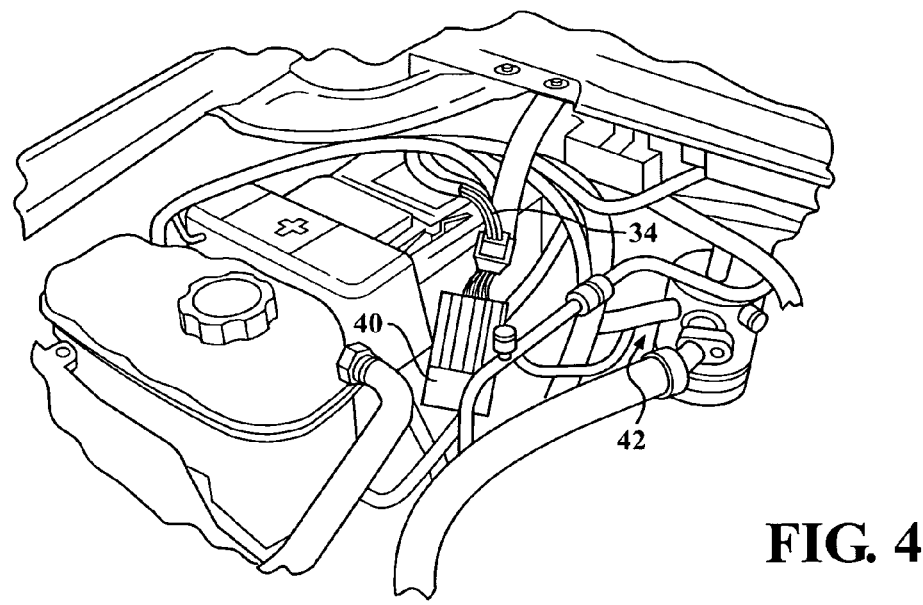
FIG. 4 is a perspective view of a controller connected to a wiring harness used in the operation of a running board, according to the present invention.
Figure 5:
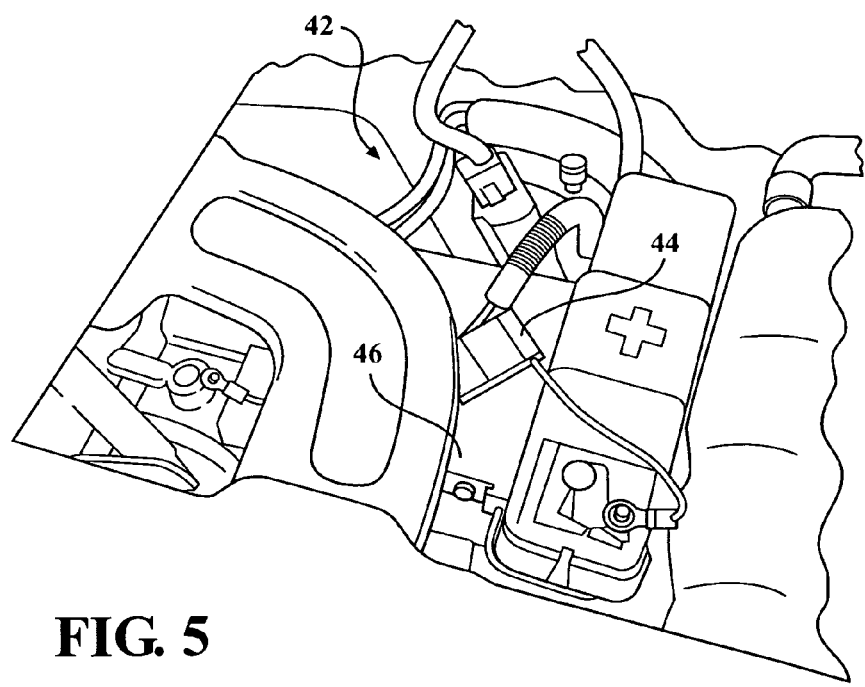
FIG. 5 is a perspective view of a wiring harness connected to a battery for providing power to the actuator of a drop-down running board, according to the present invention.
Figure 6:
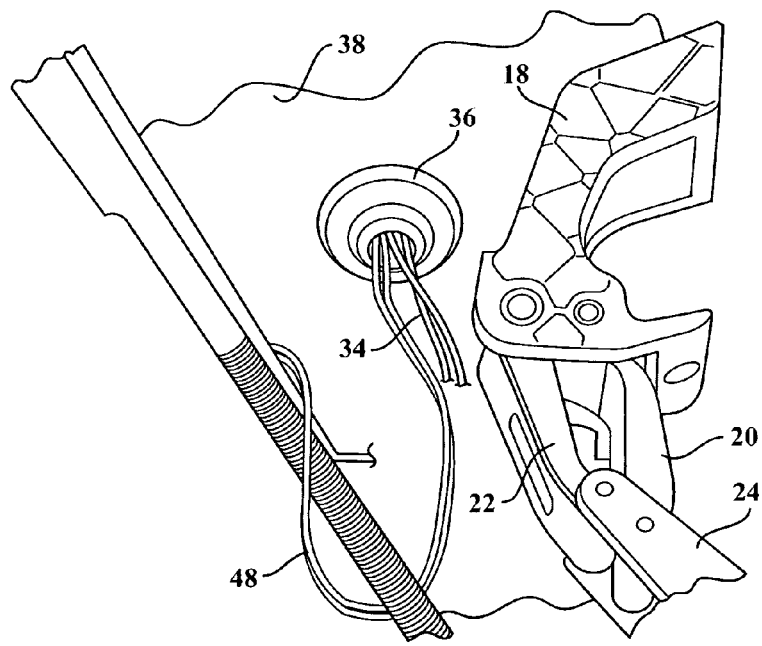
FIG. 6 is a perspective view of the underside of a vehicle having a drop-down running board, according to the present invention.
Figure 7:
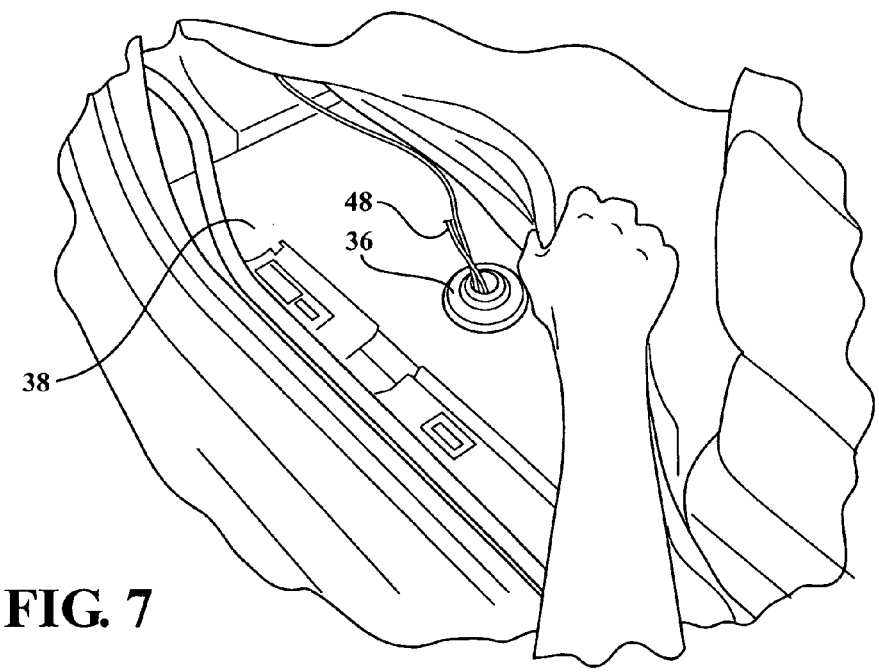
FIG. 7 is a first perspective view of the inside of a vehicle having a drop-down running board, according to the present invention.

Referring again to the Figures generally, connected to the motor 30 is a first set of wires 34, and the wires 34 and are connected to a controller 40 (shown in FIG. 4) in the engine compartment, shown generally at 42, and are also connected to a wiring harness 44 which is connected to the vehicle battery 46 (shown in FIG. 5). The vehicle battery 46 is used for supplying power to the electric motor 30, and the controller 40 is also wired to the sensor, which will be described later.

Figure 8:
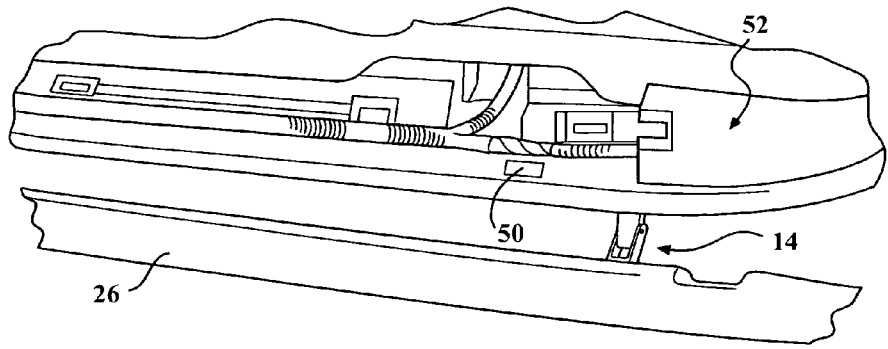
FIG. 8 is a second perspective view of the inside of a vehicle having a drop-down running board, according to the present invention.

There is also a second set of wires 48 which extend through a grommet 36 in the floorboard 38 of the vehicle 12. The wires 48 are connected to the first part 50 of a sensor, which is mounted to the door sill, generally shown at 52 in FIG. 8. The second part 54 of the sensor is mounted to the door 56 of the vehicle 12 such that the first part 50 and second part 54 of the sensor are in substantial alignment with one another when the door 56 is in a closed position. The second part 54 of the sensor is a sensor magnet which is connected to the door 56 using pressure sensitive adhesive tape, or PSA tape. In addition to being connected to the first part 50 of the sensor, the second set of wires 48 are also connected to the controller 40. While in the preferred embodiment, a magnetic proximity sensor is disclosed. Those skilled in the art will recognize that other electric, photo electric, or mechanical proximity sensors can be employed to provide the proper signal to the controller. Furthermore, while it has been described that the second part 54 of the sensor is mounted to the door 56, and the first part 50 of the sensor is mounted to the door sill 52, each part 50,54 of the sensor may be positioned on different locations on the vehicle 12 or the door 56.

In operation, when the door 56 of the vehicle is in the closed position, the first part 50 and the second part 54 are in proximity to one another, and the running board 10 is in the stowed position. When in the stowed position, the running board 10 is substantially out of view and located underneath the vehicle 12.

When the door 56 of the vehicle 12 is opened, the first part 50 and second part 54 of the sensor are moved away from one another, which is detected by the controller 40 because of a signal sent to the controller 40 through the wires 48. The controller 40 then sends a signal through the first set of wires 34 to the electric motor 30, the motor 30 is then actuated to power the gear train assembly 32, pivoting the second inner link 22 relative to the base bracket 18, which in turn causes the first inner link 20 and the outer link 24 to pivot as well. The inner links 20, 22 and the outer link 24 are all connected to one another such that they move simultaneously in a predetermined manner when the electric motor 30 actuates the gear train assembly 32. The movement or rotation of the inner links 20,22 is dictated by the length of the links 20,22, the connection between the inner links 20,22 and the base bracket 18, as well as the connection between the inner links 20,22 and the outer link 24. This also affects the location of the deployed position of the running board 10, and more specifically, the step portion 26.

The motor 30 drives one of the linkage assemblies 14a, and the other linkage assembly 14b acts as an "idler" linkage assembly 14b. The step portion 26 of the running board 10 being connected to the outer link 22 of the other linkage assembly 14b ensures that both linkage assemblies 14a, 14b move in unison when the motor 30 is actuated. While one motor 30 and gear train assembly 32 are shown connected to one of the linkage assemblies 14a, it is within the scope of the invention that two motors 30 and two gear train assemblies 32 may be used, one with each of the linkage assemblies 14a, 14b for providing additional force to change the running board 10 between the stowed and deployed positions. The running board 10 is essentially the same on both sides of the vehicle 12, and there are sensors on each side of the vehicle 12 used with each door 56, depending on whether the vehicle 12 has two doors or four. Any of the sensors may be used to detect the opening and closing of one of the doors, thereby triggering the actuation of the motor 30 to move the running board 10 to the deployed position.

One of the advantages of the present invention is that the drop-down running board 10 has separate wires 34, 48 from the wiring system of the vehicle 12, and is triggered by a signal separate from other signals being transmitted throughout the vehicle 12. The drop-down running board 10 is installed with greater simplicity and may be installed in the same manner on different vehicles because of the separate wiring and signals that are used to control actuation.

Figure 9:
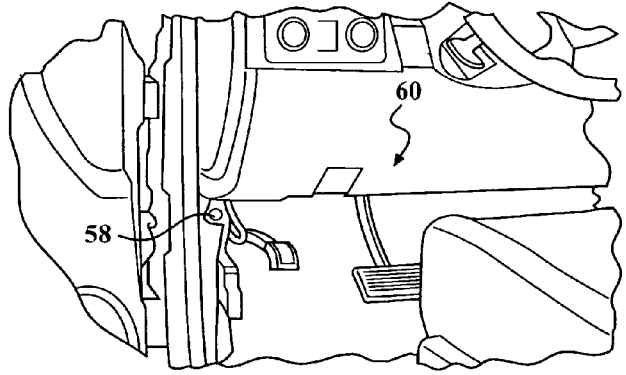
FIG. 9 is a perspective view of a dashboard of a vehicle having a sender/receiver used in the operation of a drop-down running board, according to the present invention.

In an alternate embodiment shown in FIG. 9, a sender/receiver 58 is in wireless communication with the controller 40, and the second set of wires 48 are connected to the sender/receiver 58 and the first part 50 of the sensor. The sender/receiver 58 is mounted underneath the dashboard 60 of the vehicle 12. The sensor having the two parts 50, 54 essentially operates in the same manner as described in the previous embodiment. However, the signal from the sensor is sent through the wires 48 to the sender/receiver 58. The sender/receiver 58 wirelessly communicates with the controller 40, and the controller 40 the commands the motor 30 to actuate, thereby deploying the running boards 10.

In another embodiment of the present invention, the controller 40 may be linked electronically to a vehicle key fob such that the key fob may be used to move the drop-down running board 10 for a preset period of time when passengers are approaching the vehicle, such that the drop-down running board 10 may be moved to the deployed position prior to the door 56 being opened.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A drop-down running board assembly, comprising:
at least one linkage assembly connected to a vehicle having at least one door;

a sensor having a first part and a second part, one of said first part or said second part mounted to said door, the other of said first part or said second part mounted to said vehicle;

a step portion connected to said at least one linkage assembly;

an actuator connected to said at least one linkage assembly such that said actuator moves said at least one linkage assembly and said step portion to a deployed position when said at least one door is moved to an open position and said first part of said sensor is moved away from said second part of said sensor, and a stowed position when said door is moved to a closed position and said first part of said sensor is positioned substantially adjacent said second part of said sensor; and separate wires connected between the sensor and the actuator, wherein the separate wires are separate from a wiring system of the vehicle and movement of the drop down running board assembly is triggered by a signal separate from the other signals being transmitted throughout the vehicle.

2. The drop-down running board assembly of claim 1, said at least one linkage assembly further comprising:
a base bracket connected to a frame of said vehicle;
a first inner link pivotally connected to said base bracket;
a second inner link pivotally connected to said base bracket; and
an outer link, each of said first inner link and said second inner link pivotally connected to said outer link, and said step portion is mounted to and supported by said outer link;
wherein said actuator controls the movement of said first inner link, said second inner link, and said outer link to change said drop-down running board between said deployed position and said stowed position.

3. The drop-down running board assembly of claim 2, said at least one linkage assembly further comprising a plurality of linkage assemblies, each of said plurality of linkage assemblies connected to said frame of said vehicle and said step portion, said plurality of linkage assemblies move substantially in unison as said drop-down running board assembly is moved between said stowed position and said deployed position.

4. The drop-down running board assembly of claim 2, further comprising:
an electric motor being part of said actuator;
a gear train assembly connected to one of said first inner link or said second inner link, said gear train assembly being part of said actuator; and
a controller for controlling the operation of said electric motor based on a condition detected by said sensor;
wherein said controller actuates said electric motor to pivot one of said first inner link or said second inner link when said sensor detects said first part of said sensor is moved away from said second part of said sensor, or when said first part of said sensor is positioned substantially adjacent to said second part of said sensor.

5. The drop-down running board assembly of claim 1, further comprising:
a sender/receiver in wireless communication with said controller and either of said first part of said sensor or said second part of said sensor;
wherein said sender/receiver sends a signal to said controller when said first part of said sensor is moved away from said second part of said sensor, and said controller communicates with said motor to actuate said at least one linkage assembly, moving said at least one linkage assembly and said step portion to said deployed position.

6. The drop-down running board assembly of claim 1, further comprising
a door sill, said first part of said sensor connected to said door sill;
wherein said second part of said sensor is connected to said door such that when said door is in said closed position, said first part of said sensor is substantially adjacent said second part of said sensor, and as said door is moved to said open position, said second part of said sensor is moved away from said first part of said sensor.

7. The drop-down running board assembly of claim 1, wherein said at least one linkage assembly further comprises a first linkage assembly and a second linkage assembly.

8. The drop-down running board assembly of claim 7, said second linkage assembly further comprising an idler linkage assembly.

9. The drop-down running board assembly of claim 1, said second part of said sensor further comprising a sensor magnet.

10. The drop-down running board assembly of claim 9, wherein said sensor magnet is connected to said door using pressure sensitive adhesive tape.

11. The drop-down running board assembly of claim 1, wherein said sensor is one selected from the group consisting of a magnetic proximity sensor, an electric sensor, a photo electric sensor, and combinations thereof.

12. A drop-down running board assembly, comprising:
a step portion;
a first linkage assembly connected to said step portion;
a second linkage assembly connected to said step portion;
a door pivotally connected to a vehicle;
a sensor for detecting when said door is moved between an open position and a closed position;
an actuator connected to one of said first linkage assembly or said second linkage assembly such that when said door is moved to an open position, said sensor detects said door is opened, and said actuator moves said first linkage assembly, said second linkage assembly, and said step portion from a stowed position to a deployed position; and
separate wires connected between the sensor and the actuator, wherein the separate wires are separate from a wiring system of the vehicle and movement of the drop down running board assembly is triggered by a signal separate from the other signals being transmitted throughout the vehicle.

13. The drop-down running board assembly of claim 12, said sensor further comprising:
a first part connected to a door sill of said vehicle; and
a second part connected to said door such that when said door is in said closed position, said first part of said sensor is located in proximity to said second part of said sensor;
wherein said second part of said sensor is moved away from said first part of said sensor when said door is moved to said open position.

14. The drop-down running board assembly of claim 12, said first linkage assembly further comprising:
a base bracket connected to a frame of said vehicle;
a first inner link pivotally connected to said base bracket;
a second inner link pivotally connected to said base bracket, said actuator connected to and operable for pivoting said second inner link relative to said base bracket; and an outer link pivotally connected to said first inner link and said second inner link, and said step portion is connected to and supported by said outer link;

wherein said first inner link, said second inner link, and said outer link move simultaneously when said actuator moves said second inner link.

15. The drop-down running board assembly of claim 13, further comprising:
a sender/receiver in wireless communication with said controller and either of said first part of said sensor or said second part of said sensor;
wherein said sender/receiver sends a signal to said controller when said first part of said sensor is moved away from said second part of said sensor, and said controller communicates with said motor to actuate said first linkage assembly, moving said first linkage assembly, said second linkage assembly, and said step portion to said deployed position.

16. The drop-down running board assembly of claim 12, further comprising:
a controller in electrical communication with said actuator and said sensor;
wherein said actuator is an electric motor connected to said first linkage assembly, and said controller commands said electric motor to change said first linkage assembly between said stowed position and said deployed position, thereby changing said second linkage assembly and said step portion between said stowed position and said deployed position.

17. The drop-down running board assembly of claim 13, said second part of said sensor further comprising a sensor magnet.

18. The drop-down running board assembly of claim 17, wherein said sensor magnet is connected to said door using pressure sensitive adhesive tape.

19. The drop-down running board assembly of claim 12, wherein said sensor is one selected from the group consisting of a magnetic proximity sensor, an electric sensor, a photo electric sensor, and combinations thereof.

20. The drop-down running board assembly of claim 12, wherein said second linkage assembly is an idler linkage assembly.

21. A drop-down running board assembly:
a step portion;
a first linkage assembly connected to said step portion;
a second linkage assembly connected to said step portion;
an electric motor connected to said first linkage assembly through the use of a gear train assembly;
a sensor;
a controller operable for controlling the operation of said electric motor by a condition detected by said sensor;
a first part of said sensor;
a second part of said sensor;
a vehicle having a vehicle frame, each of said first linkage assembly and said second linkage assembly connected to said vehicle frame;
a door sill being part of said vehicle, said first part of said sensor mounted to said door sill;
a door being part of said vehicle, said second part of said sensor mounted to said door such that said first part of said sensor is in substantial alignment with said second part of said sensor when said door is in a closed position, and first linkage assembly, said second linkage assembly, and said step portion are in a stowed position;
wherein said first linkage assembly, said second linkage assembly, and said step portion are in a deployed position when said door is in an open position such that said first part of said sensor is moved away from said second part of said sensor
a first set of wires connected to the motor and the controller;
a second set of wires connected to the first part of the sensor;
wherein the first set of wires and the second set or wires are separate wires that are separate from the wiring system of the vehicle and the movement of the drop down running board assembly is triggered by a signal separate from the other signals being transmitted throughout the vehicle.

22. The drop-down running board assembly of claim 21, further comprising:
a sender/receiver in wireless communication with said controller and either of said first part of said sensor or said second part of said sensor;
wherein said sender/receiver sends a signal to said controller when said first part of said sensor is moved away from said second part of said sensor, and said controller communicates with said motor to actuate said first linkage assembly, moving said first linkage assembly, said second linkage assembly, and said step portion to said deployed position.

23. The drop-down running board assembly of claim 21, wherein said second part of said sensor further comprises a sensor magnet.

24. The drop-down running board assembly of claim 23, wherein said sensor magnet is connected to said door using pressure sensitive adhesive tape.

25. The drop-down running board assembly of claim 21, wherein said sensor is one selected from the group consisting of a magnetic proximity sensor, an electric sensor, a photo electric sensor, and combinations thereof.

26. The drop-down running board assembly of claim 21, said first linkage assembly further comprising:
a base bracket connected to said vehicle frame;
a first inner link pivotally connected to said base bracket;
a second inner link pivotally connected to said base bracket, said second inner link driven for rotation by said gear train assembly; and
an outer link, said first inner link pivotally connected to said outer link, and said second inner link pivotally connected to said outer link;
wherein said step portion is connected to said outer link, and said first inner link and said second inner link are pivotally connected to said outer link such that said first inner link, said second inner link, and said outer link move simultaneously when said electric motor pivots said second inner link such that said first linkage assembly moves between said stowed position and said deployed position.

27. The drop-down running board assembly of claim 21, wherein said second linkage assembly is an idler linkage assembly.

* * * * *